United States Patent [19]

Davydov et al.

[11] 3,993,915

[45] Nov. 23, 1976

[54] COHERENT SECOND HARMONIC GENERATION DEVICE

[76] Inventors: Boris Leonidovich Davydov, ulitsa Nakhimova, 17, kv. 63, Fryazino Moskovskoi oblasti; Vladislav Fedorovich Zolin, ulitsa akademika Pavlova 40, kv. 36; Lidia Georgievna Koreneva, ulitsa Udaltsova, 4, kv. 287, both of Moscow; Evgeny Anatolievich Lavrovsky, ulitsa Vokzalnaya, 19, kv. 153, Fryazino Moskovskoi oblasti,, U.S.S.R.

[22] Filed: Dec. 8, 1975

[21] Appl. No.: 638,940

[52] U.S. Cl. .............................. 307/88.3; 321/69 R

[51] Int. Cl.$^2$ .......................................... H02M 5/04

[58] Field of Search .................. 307/88.3; 321/69 R

[56] References Cited

OTHER PUBLICATIONS

Falk et al., "IEEE Journal of Quantum Electronics," June 1969, pp. 356–357.

*Primary Examiner*—R. V. Rolinec
*Assistant Examiner*—Darwin R. Hostetter
*Attorney, Agent, or Firm*—Lackenbach, Lilling & Siegel

[57] ABSTRACT

A device for coherent optical and infrared second harmonic generation comprising an active laser element, a cavity Q-switched to the fundamental frequency of the active laser element, thereby ensuring formation of a zone of intersection of the fundamental frequency beams, and a nonlinear crystal placed inside the fundamental frequency cavity in the fundamental frequency beams intersection zone, said crystal generating the second harmonic under noncollinear synchronism conditions and transparent for both the fundamental frequency and second harmonic. The proposed device permits second harmonic generation under non-collinear synchronism conditions in a nonlinear crystal. This allows a spectroscopically pure second harmonic to be obtained and widens the field of nonlinear crystals application.

6 Claims, 5 Drawing Figures

COHERENT SECOND HARMONIC GENERATION DEVICE

The present invention relates to stimulated radiation devices and, in particular, to coherent second-harmonic generation devices.

The invention may be used in communications engineering, data transmission, selective initiation of chemical reactions, spectroscopy, and laser engineering.

Definitions of some terms that follow are supplied for better understanding of the essence of the invention.

Optical cavity axis is a line of travel of radiative fluxes circulating in the cavity and characterized by wave vectors $\vec{K}$.

Second-harmonic generation in a nonlinear crystal under collinear synchronism conditions is harmonic generation when the wave vectors of the waves involved in a nonlinear process obey the vector ratio $\vec{K}^{2w} = \vec{K}^{w} + \vec{K}^{w}$, remaining parallel to each other. Here, $$\left|\vec{K}^{2w}\right| = \frac{n^{2w} \cdot 2w}{c} \; (1); \; \vec{K}^{w} = \frac{n^{w} \cdot w}{c} \qquad (2)$$

where $n^w$ and $n^{2w}$ are refractive indices for the fundamental and second-harmonic frequencies; $w$ and $2w$ are fundamental and second-harmonic frequencies; and $C$ is the velocity of light.

The above-mentioned vector ratio for wave vectors holds true in second-harmonic generation in a nonlinear crystal under noncollinear synchronism conditions. However, the wave vectors themselves are not parallel.

Noncollinear synchronism is characterized by a synchronism angle between the wave vectors $\vec{K}^w$ and $\vec{K}^w$ of fundamental frequency beams in a nonlinear crystal.

External synchronism angle is an angle between the wave vectors $\vec{K}^w$ and $\vec{K}^w$ of the fundamental frequency beams incident upon an input surface or output surfaces of a nonlinear crystal and interacting therein under noncollinear synchronism conditions.

Intersection angle is an angle between the wave vectors $\vec{K}^w$ and $\vec{K}^w$ of the fundamental frequency beams incident upon a non-linear crystal placed in the intersection zone.

Giant pulsing is fundamental frequency pulse generation by an active laser element, wherein the generated pulse power exceeds several megawatts in a cross-section of I $cm^2$.

It is common knowledge that a nonlinear crystal should expediently be placed inside a laser cavity for more efficient conversion of electromagnetic radiation to its second harmonic. Such conversion is assumed to employ collinear synchronism phenomena in a nonlinear crystal. It is hard to obtain a spectroscopically pure second-harmonic since the directions of fundamental and second-harmonic frequencies coincide. Nonlinear processes in a nonlinear crystal under noncollinear synchronism conditions are to be preferably used to obtain a spectroscopically pure secondharmonic. The direction of second-harmonic frequency propagation is principally different from that of the fundamental frequency.

A prior art device for coherent second harmonic generation comprises a cavity, composed of two flat or spherical multilayer dielectric ceated mirrors, with an axially located cylindrical active laser element, made of the crystal YAG+$Nd^{3+}$, and a nonlinear crystal. The nonlinear crystal is cut in the direction of respective collinear synchronism. A plane-parallel glass plate, inclined at the Brewsterian angle to the cavity axis, is introduced into the cavity to polarize the active laser element and to optimize matching with the nonlinear crystal. The cavity mirrors are made so that one of them reflects fully at both frequencies, whereas the second mirror, the output one, reflects fully at the fundamental frequency only, being completely transparent at the second harmonic frequency. In this case, the generated second harmonic leaves the cavity through the output mirror.

With the frequency being doubled in this device, second harmonic generation occurs in the direction of the output mirror, as well as in the direction of the active laser element. This is due to two opposing fluxes of the fundamental radiation circulating inside the cavity. The active laser element absorbing the second harmonic, only a half of the converted power is released from the cavity. A complete release may be achieved with the help of devices employing an additional mirror inside the cavity.

Another prior art device for coherent second harmonic generation comprises an active laser element, acting as a source of a plane-polarized beam of the fundamental frequency; and a Q-switch unit, used for generation of the giant-pulse active laser element, placed to the left of this active laser element. Longitudinal axes of the Q-switch unit and the active laser element coincide. The fundamental frequency cavity is made up of three mirrors totally reflecting the fundamental frequency. The first mirror is located to the left of the Q-switch unit; the input surface normal of the first mirror coincides with the longitudinal axis of the active laser element. The second mirror is to the right of the active laser element and reflects the fundamental frequency beam in the opposite direction at an acute angle $\alpha$ to the axis of the active laser element.

A nonlinear crystal is interposed in the reflected beam. This crystal is cut as a plane-parallel plate so that, with the fundamental frequency beams being normally incident thereupon, collinear synchronism conditions are ensured. Two second harmonic beams leave the nonlinear crystal in opposite directions. One of the beams travels in the direction of the second mirror of the cavity transparent for the second harmonic. This beam passes out of the cavity through that mirror. The second beam is reflected from the third mirror of the cavity, totally reflecting both the fundamental frequency and the second harmonic. The normal of this mirror forms an angle $\alpha$ with the longitudinal axis of the active laser element. After being reflected, the second harmonic beam passes the nonlinear crystal and escapes from the cavity through the second mirror. Thus, it is the second harmonic, basically, that escapes from the cavity due to the reflective selectivity of the second mirror at both frequencies. However, the second deflecting mirror being imperfect, the harmonic is always to a certain degree accompanied along its path by the fundamental frequency. Additional filtering is required in this case to obtain a spectroscopically pure second harmonic.

It is a principal object of this invention to provide a coherent second harmonic generation device wherein the output monochromatic pencil-beamed second harmonic is free of any addition of the fundamental frequency.

This object is achieved by a device for coherent optical and infrared second harmonic generation comprising an active laser element acting as a source of a fundamental frequency beam travelling along its longitudinal axis, a Q-switch unit ensuring giant pulsing of the active laser element and being placed to the left of the active laser element so that their longitudinal axes coincide, a fundamental frequency cavity made up of at least three mirrors totally reflecting the fundamental frequency beam, the first of said mirrors being placed to the left of the Q-switch unit so that the normal to the working surface of the first mirror coincides with the longitudinal axis of the active laser element, the second mirror being placed to the right of the active laser element and intended to deflect the fundamental frequency beam from its original direction so that an intersection zone of the fundamental frequency beams, characterized by an intersection angle, is formed, the third mirror being interposed in the fundamental frequency beam deflected by the second mirror and passing the fundamental frequency beams intersection zone so that the normal to said mirror working surface coincides with the longitudinal axis of said deflected beam and a nonlinear crystal generating the second harmonic under synchronism conditions and transparent for the fundamental frequency and the second harmonic said crystal being placed inside the fundamental frequency cavity across the fundamental frequency beam, in accordance with the invention, said nonlinear crystal is cut so that its shape and attitude with respect to the reference axes ensures noncollinear synchronism conditions for the fundamental frequency and second harmonic beams travelling therein, the nonlinear crystal being placed in the intersection zone of the fundamental frequency beams so that the second harmonic beam, escaping from the nonlinear crystal, travels along the bisectrix of the external synchronism angle.

It is expedient that the nonlinear crystal be placed inside the second harmonic cavity made up of two mirrors arranged on both sides of the nonlinear crystal and the second mirror of the fundamental frequency cavity, the normals to the working surfaces of the second harmonic mirrors coinciding with the bisectrix of the external synchronism angle, one of the mirrors totally reflecting the second harmonic and the other reflecting but a part thereof, the base of the fundamental frequency beams intersection zone being in contact with the working surface of the second mirror of the fundamental frequency cavity, said second mirror of the fundamental frequency cavity, made as a multi-dielectric coated substrate being totally transparent for the second harmonic.

The second mirror of the fundamental frequency cavity is to be preferably made as a reflecting prism for fundamental frequency generation.

It is also expedient that the second mirror of the fundamental frequency cavity reflect the second harmonic and at the same time be one of the mirrors of the second harmonic cavity.

Another embodiment of the invention comprises a second mirror of the fundamental frequency cavity made as a system of mirrors totally reflecting the fundamental frequency and forming twice as big an intersection zone of the fundamental frequency beams said second mirror being disposed between the active laser element and the mirror system, the nonlinear crystal being placed inside the second harmonic cavity made up of two mirrors arranged on both sides of said nonlinear crystal so that the normals to the working mirror surfaces coincide with the bisectrix of the external synchronism angle, the first mirror totally reflecting the second harmonic and the other reflecting but a part thereof.

It is advisable that at least one additional mirror be introduced into the fundamental frequency cavity to maintain generation of a fundamental frequency travelling wave in the fundamental frequency cavity and to form an intersection zone of the fundamental frequency beams, characterized by an external synchronism angle, the normals of all mirrors of the fundamental frequency cavity making angles with the longitudinal axis of the active laser element.

The device for coherent second harmonic generation permits a spectroscopically pure, monochromatic, pencil-beamed second harmonic to be produced and, besides, widens the field of nonlinear crystals application.

The invention will now be described with reference to specific embodiments thereof, taken in conjunction with the accompanying drawings, wherein.

Figure 1:
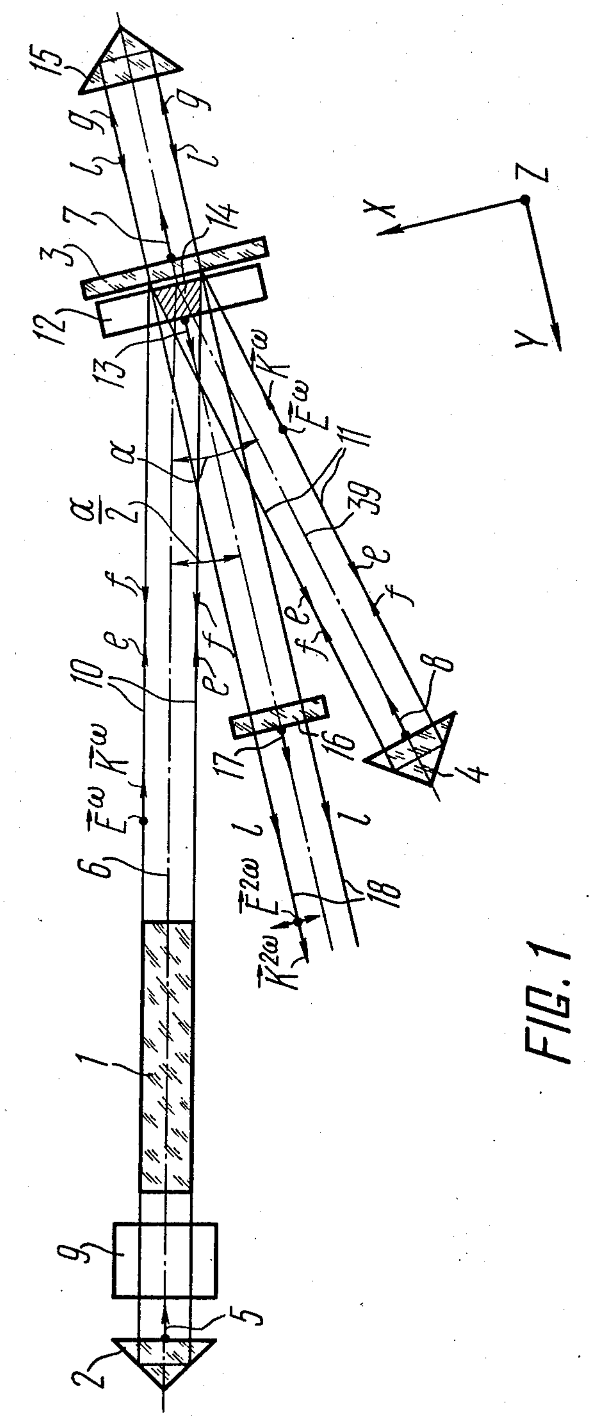
FIG. 1 is an optical circuit diagram of a device for coherent second harmonic generation, in accordance with the invention.

The device for coherent second harmonic generation comprises an active laser element 1 (FIG. 1), made as a cylindrical ion $Nd^{3+}$ doped glass rod and placed inside a cavity formed by a totally reflecting first mirror 2, a second mirror 3, and a third mirror 4. The first mirror 2 is disposed to the left of the active laser element 1. A normal 5 to the working surface of the first mirror 2 coincides with the longitudinal axis 6 of the active laser element 1. The second mirror 3 is disposed to the right of the active laser element 1, its normal 7 making an acute angle $\alpha/2$ with the longitudinal axis 6 of the active laser element 1, equal to one half of the external synchronism angle. A normal 8 of the third mirror 4 makes an acute angle $\alpha$ with the longitudinal axis 6 of the active laser element 1, equal to the external synchronism angle. The first mirror 2 and the third mirror 4 are made as glass or quartz 90° reflecting prisms, their hypotenuse faces serving as input working surfaces.

The mirrors 2 and 4 may also be made as plane-parallel multi-dielectric layer substrates. A Q-switch unit 9 is positioned between the first mirror 2 and the active laser element 1.

Fundamental frequency beams 10 and 11 generated by the active laser element 1 are plane polarized, which is determined by vectors $\vec{E}^{w}$ and $\vec{K}^{w}$.

A nonlinear crystal 12 is disposed immediately before the second mirror 3 of the fundamental frequency cavity on the side of the active laser element 1. The nonlinear crystal 12 transparent at both frequencies is made as a plane-parallel plate from metanitroaniline crystal and is oriented to comply with the reference axes X, Y, Z. The Z axis is oriented parallel to the vector $E^w$. A normal 13 to the input surface of the nonlinear crystal 12 is parallel to the normal 7 of the second mirror 3. The nonlinear crystal 12 is located in an intersection zone 14 of the fundamental frequency beams 10 and 11.

At the same time, the nonlinear crystal 12 and the second mirror 3 are inside the second harmonic cavity formed by mirrors 15 and 16. An axis 17 of the second harmonic cavity coincides with the normal 7 of the second mirror 3 of the fundamental frequency cavity. A second harmonic beam 18 is plane polarized, which is determined by the vectors $\vec{E}^{2w}$ and $\vec{K}^{2w}$. The polarization plane of the fundamental frequency beams 10 and 11 is perpendicular to the plane wherein the beams 10 and 11 are transmitted.

The arrows *e* and *f* indicate the direction of the fundamental frequency beams 10 and 11, whereas the arrows *l* and *g* indicate that of the second harmonic beam 18.

Figure 2:
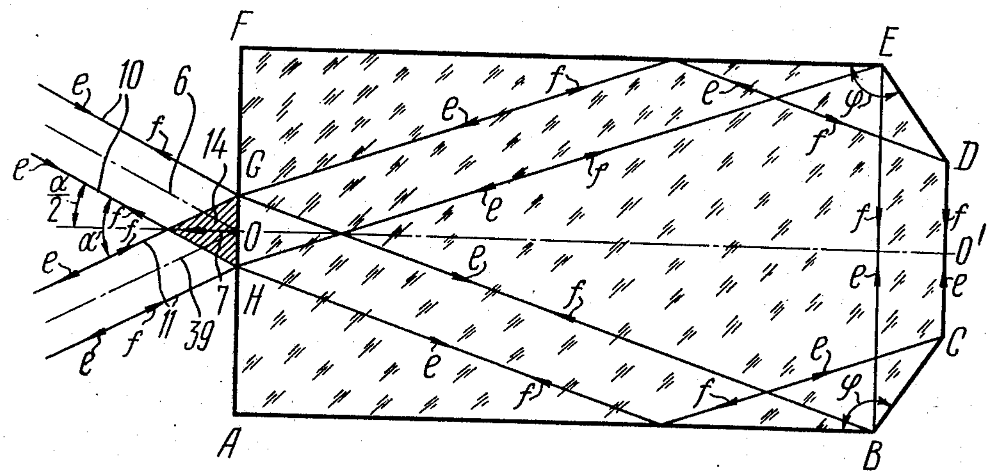
FIG. 2 is a longitudinal showing the paths of the waves inside the second mirror of the fundamental frequency cavity made as a reflecting prism, in accordance with the invention.

The second mirror 3 (FIG. 2) of the fundamental frequency cavity may be made as a reflective prism to generate the fundamental frequency. The reflective prism is made of a dielectric with a refractive index n and formed by polished faces, their edges being denoted AB, BC, CD, DE, EF and AF. The faces designated by edges AB and EF, AF and CD are respectively parallel. The faces designated by edges AB and BC, EF and DE make respectively obtuse angles $\phi$. The faces designated by edges AF and AB, AF and EF make respectively right angles. The prism has a longitudinal symmetry axis 00′. GH stands for the cone base of the intersection zone 14, disposed upon the input face AF symmetric about the longitudinal symmetry axis 00′. The arrows e and f indicate the directions of the fundamental frequency beams 10 and 11.

Figure 3:
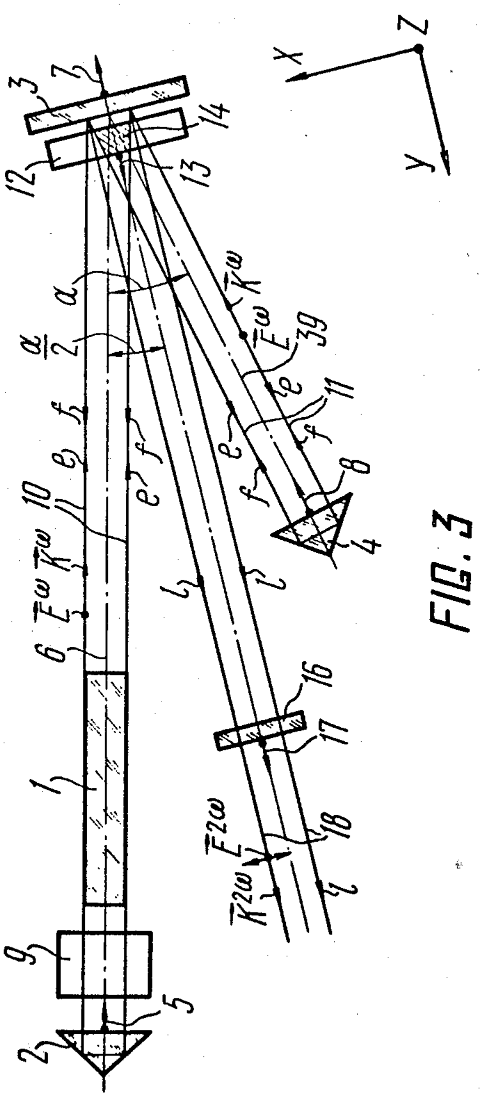
FIG. 3 is another embodiment of an optical circuit of a device for coherent second harmonic generation, in accordance with the invention.

FIG. 3 shows an embodiment wherein the second mirror 3 totally reflects the second harmonic beams.

Figure 4:
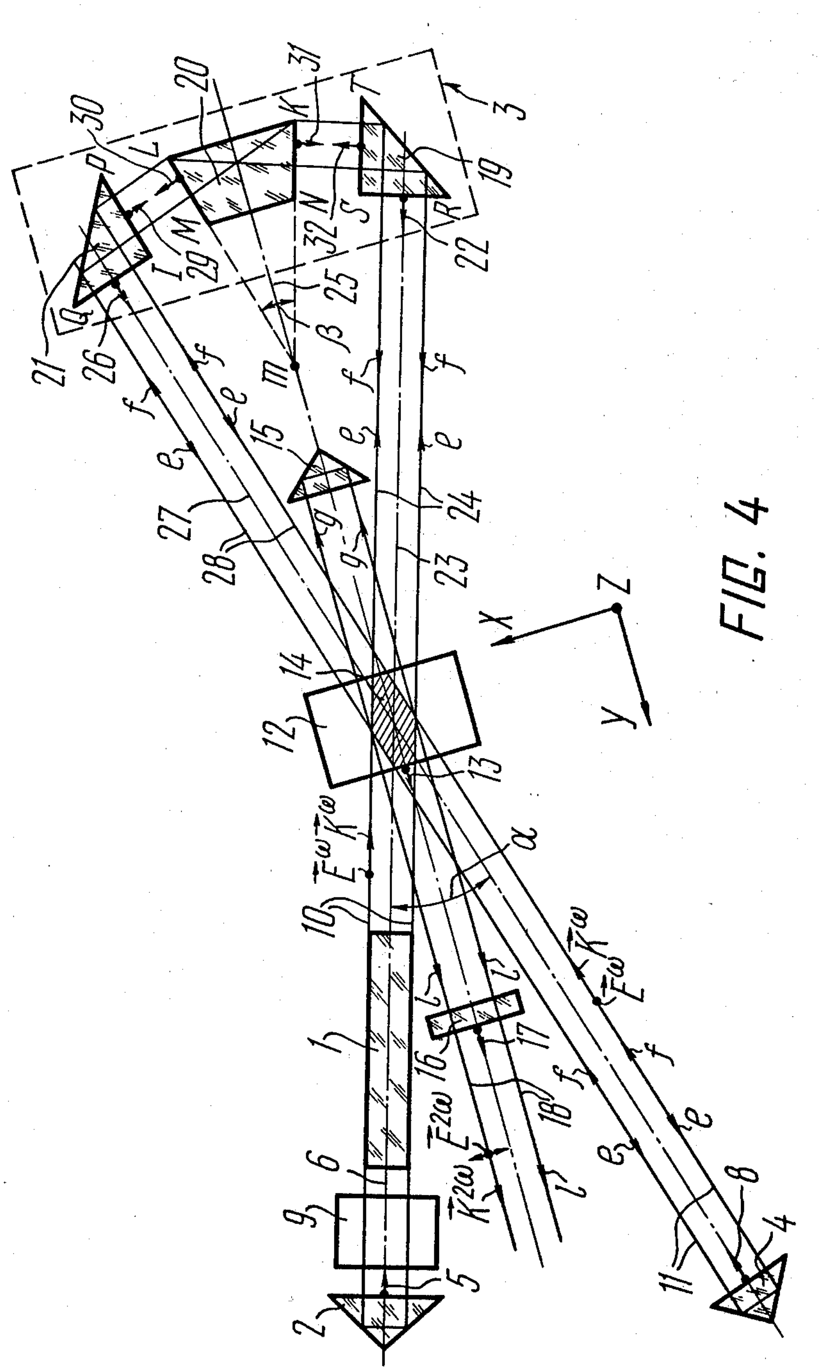
FIG. 4 shows another embodiment of an optical circuit of the device wherein a mirror system is employed as the second mirror of the fundamental frequency cavity, in accordance with the invention.

Referring now to FIG. 4, another embodiment of the device comprises the second mirror 3 of the fundamental frequency cavity made as a system of prisms 19, 20 and 21. The prisms 19 and 21 are reflecting isosceles fundamental frequency prisms with the equal faces converging at right angles. The prism 20 is a truncated isosceles prism with an base KL and an acute angle between the equal faces equal to the external synchronism angle $\alpha$. The prism 19 is placed so that a normal 22 to the face RS coincides with a longitudinal axis 23 of a fundamental frequency beam 24. The prism 20 is placed so that the vertex *m* of the angle $\beta$ is pointed in the direction of the nonlinear crystal 12.

A bisectrix 25 of the angle $\beta$ coincides with the longitudinal axis 17 of the second harmonic cavity. The prism 21 is positioned so that its face IP is parallel to the face ML of the prism 20. A normal 26 to the face IQ of the prism 21 coincides with a longitudinal axis 27 of a fundamental frequency beam 28. The prisms 19, 20 and 21 are positioned so that their surface normals 22, 26, 29, 30, 31 and 32 lie in one plane perpendicular to the fundamental frequency polarization plane.

Figure 5:
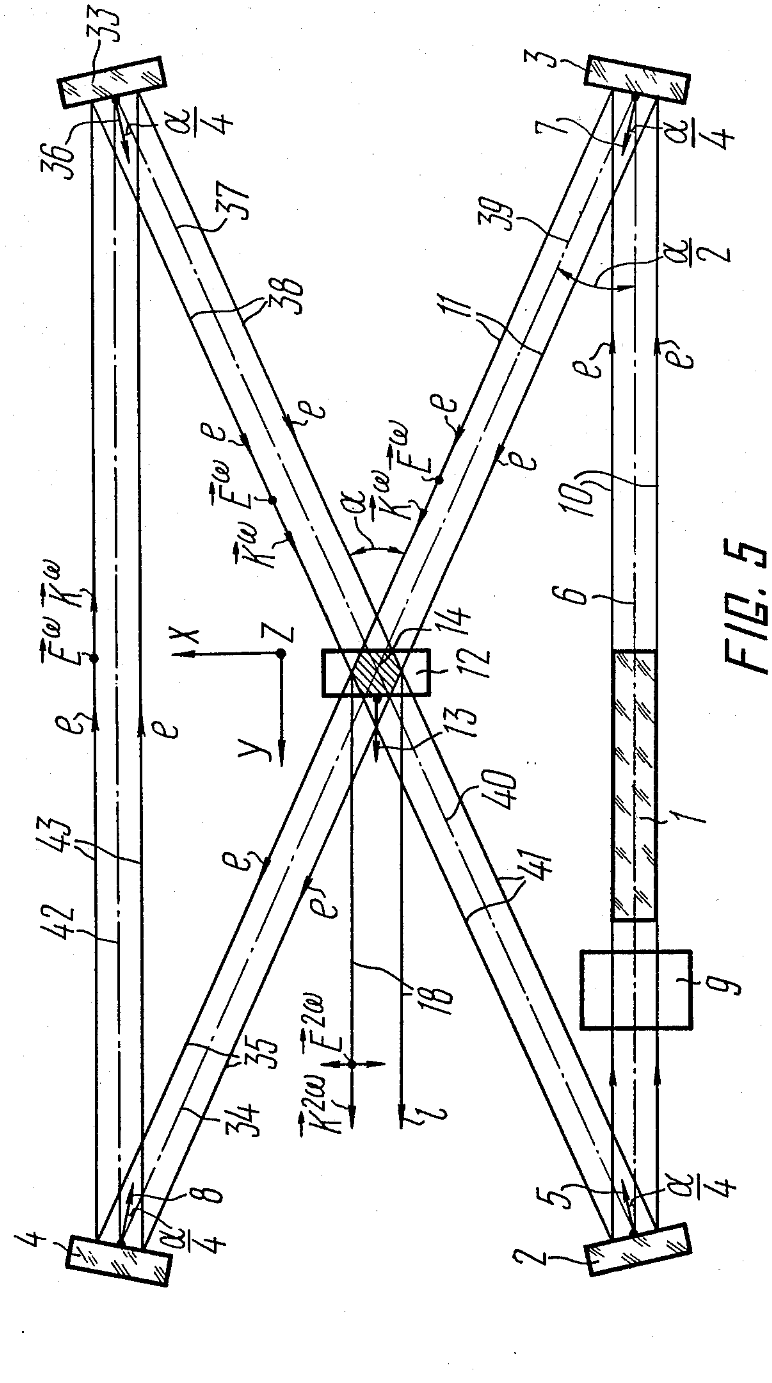
FIG. 5 is another embodiment of an optical circuit of the device with a ring cavity of the fundamental frequency in accordance with the invention.

Referring now to FIG. 5, still another embodiment of the device comprises a fundamental frequency cavity, wherein an additional fourth mirror, totally reflecting the fundamental frequency, is placed. The normals 5 and 7 of the first mirror 2 and the second mirror 3 respectively make an actue angle $\alpha/4$ with the longitudinal axis 6 of the active laser element 1 and are not parallel. The normal 8 of the third mirror 4 makes an acute angle $\alpha/4$ with a longitudinal axis 34 of a fundamental frequency beam 35, whereas a normal 36 of a fourth mirror 33 makes an acute angle $\alpha/4$ with a longitudinal axis 37 of a fundamental frequency beam 38. A longitudinal axis 39 of the fundamental frequency beam 11 makes an acute angle $\alpha/2$ with the longitudinal axis 6 of the active laser element I. Longitudinal axes 37 and 39 of respective beams 38 and 11 form an acute angle $\alpha$. A longitudinal axis 40 of a fundamental frequency beam 41 makes an acute angle $\alpha$ with the longitudinal axis 34 of the fundamental frequency beam 35. Longitudinal axes 42 and 6 of the fundamental frequency beams 43 and 10 are parallel.

The fundamental frequency is generated in the fundamental frequency cavity through excitation of the active laser element 1 (FIG. 1) by a pumping source (not shown). The Q-switch unit 9 forms giant pulses of plane-polarized fundamental frequency. Being that the fundamental frequency cavity is made up of the plane-parallel mirrors 2, 3 and 4 totally reflecting the fundamental frequency, the fundamental frequency beams 10 and 11 circulate inside the cavity toward each other. The fundamental frequency beams 10 and II, coming from the first and third mirrors 2 and 4, intersect near the second mirror 3 and form the intersection zone 14 in the shape of a cone with the base upon the surface of the second mirror 3. The fundamental frequency is converted into the second harmonic in the nonlinear crystal 12 disposed in the intersection zone 14 of the fundamental frequency beams 10 and 11. The wave vectors $\vec{K}^w$ and $\vec{K}^w$ of the fundamental frequency beams 10 and 11, incident upon the nonlinear crystal 12, interact with the wave vector $\vec{K}^{2w}$ of the second harmonic under noncollinear synchronism conditions. This nonlinear interaction results in generation of the plane-polarized second harmonic beam 18 travelling along the bisectrix of the exterior synchronism angle $\alpha$. The second harmonic beam 18 travels in opposite directions from the nonlinear crystal 12. The second harmonic cavity, formed by the mirror 15 totally reflecting the second harmonic and the mirror 16 partially reflecting this second harmonic, serves to optimize the second harmonic generation conditions and to let the second harmonic pass outward through the mirror 16.

The second mirror 3 (FIG. 2) of the fundamental frequency cavity, made as a reflecting prism, ensures, similar to a conventional plane-parallel multi-dielectric coated mirror, formation of the intersection zone 14 of the fundamental frequency beams 10 and 11 in the shape of a cone with the base GH upon the prism input surface AF. The fundamental frequency beams 10 and 11 enter the prism through the area GH of the input surface AF, coinciding with the cone base, at equal incidence angles $\alpha/2$ and symmetrically to the longitudinal axis 00′ of the prism. The axes 6 and 39 of the fundamental frequency beams 10 and 11 intersect with the symmetry axis 00′ at the point 0. These fundamental frequency beams 10 and 11 are subjected to total internal reflection from the faces AB, BC, DE and EF and escape from the prism through the face AF at the same angles $\alpha/2$ to the normal 7 and at the same area GH. Such beam paths ensure coincidence of the fundamental frequency beam 10 running through the prism with the beam 11 reflected from the input surface AF. The following selection of dimentions and angles of the prism assures such a configuration of the paths of the fundamental frequency beams 10 and 11:

$$\phi = 135° - \frac{1}{2} \text{arc sin} \frac{\sin \frac{\alpha}{2}}{n} \quad (3)$$

where $\phi$ — the angle between the edges AB and BC;

$\alpha/2$ — the incidence angle of the fundamental frequency beams 10 and 11 upon the prism input surface AF, equal to a half of the exterior synchronism angle $\alpha$;

$n$ — the refractive index of the material of the prism.

$$d = t + \frac{4a}{\cos \frac{\alpha}{2}} \cdot \sin^2\phi \quad (4)$$

where $d$ — the length of the edge AF;

$t$ — the length of the edge CD;

$a$ — the fundamental frequency beam aperture.

$$t \geq \frac{a}{\cos \frac{\alpha}{2}} \quad (5)$$

$$l = \frac{(d + \frac{a}{\cos \frac{\alpha}{2}})}{2tg\ [\arcsin (\frac{\sin \frac{\alpha}{2}}{n})]} \quad (6)$$

where $l$ — the length of the edge AB.

$$L = l - \frac{a}{\cos \frac{\alpha}{2}} \sin 2\phi \quad (7)$$

where

L — the length of the prism along the axis 00'.

The fundamental frequency beams 10 and 11 are subjected, on entering the prism, to total internal reflection from the faces AB, BC, ED and EF, if the following conditions are observed:

$$\frac{2 - n^2}{n} \leq \sin \frac{\alpha}{2} \leq \sqrt{n^2 - 1} \quad (8)$$

The reflective prism is expendient when the fundamental frequency power exceeds the damage threshold of the multi-dielectric coating of the plane-parallel mirror.

The second mirror 3 (FIG. 3), reflecting totally both the fundamental frequency and the second harmonic, should be used in the fundamental frequency cavity in case the beams are not powerful. Introduction of such a mirror provides a means for simplification of the optical circuit of the device, and reduction of the number of elements inside the cavity, thus minimizing energy losses in the cavity. In this case, the second mirror 3 is the mirror of the second harmonic cavity. The second harmonic beam 18 travels in opposite directions from the nonlinear crystal 12, reflects from the mirror 3 and comes outside through the mirror 16 of the second harmonic cavity.

The second mirror 3 of the fundamental frequency cavity is replaced by the system of fundamental frequency reflective prisms 19, 20 and 21 to increase the size of zone 14, wherein the fundamental frequency beams 10 and 11 intersect. The fundamental frequency beam 10 passing through the nonlinear crystal 12 refracts and enters the prism 19 as the beam 24 normally through the cathetus face RS. The fundamental frequency beam 24, being subjected to total internal reflection upon the hypotenuse face RT, is deflected by 90° from its original direction and enters the prism 20 normal to its face NK so that it is subjected to total internal reflection upon its base KL. On escaping from the prism 20, the fundamental frequency beam 24 is deflected by 90° by the prism 21. All deflections of the fundamental frequency beam 24 occuring in one plane perpendicular to the fundamental frequency polarization plane. The angle $\beta$ between the equal faces ML and NK of the prism 20 being equal to the external synchronism angle $\alpha$. The fundamental frequency beam 28 coming out of the system of the prisms 19, 20 and 21 intersects the fundamental frequency beam 24 at an angle equal to the external synchronism angle $\alpha$. In this case the length of the fundamental frequency beams intersection zone 14 is twice that in the circuits illustrated in FIGS. 1, 2 and 3. Thus, thicker nonlinear crystals may be employed in the device and nonlinear conversion of the fundamental frequency to the second harmonic becomes in some cases more effective.

The embodiment of FIG. 5 unlike those shown in FIGS. 1, 2, 3 and 4, comprises a ring-shaped fundamental frequency cavity to produce the travelling wave fundamental frequency. The fundamental frequency cavity is formed by the mirrors 2, 3, 4 and 33 positioned so that the fundamental frequency, being reflected from these mirrors in the plane perpendicular to the fundamental frequency polarization plane, forms the zone 14 wherein the fundamental frequency beams 11 and 38 intersect. The acute angle between the wave vectors $\vec{K}^w$ and $\vec{K}^w$ of the fundamental frequency beams 11 and 38 incident upon the non-liner crystal 12 are equal to the exterior synchronism angle $\alpha$. As the fundamental frequency cavity is operating in the travelling wave mode $\mu$, there are no oncoming fundamental frequency beams and the second harmonic escapes from the nonlinear crystal 12 only in one direction. Similar to the circuits shown in FIGS. 1, 3 and 4, it is polarized in the plane perpendicular to the fundamental frequency polarization plane.

The proposed device for coherent second harmonic generation permits a spectroscopically pure monochromatic pencil-beamed second harmonic to be produced and widens the field of nonlinear crystals application.

What is claimed is:

1. A device for coherent optical and infrared second harmonic generation, comprising:

a. an active laser element acting as a source of a fundamental frequency beam; a longitudinal axis of said active laser element; said fundamental frequency beam travelling along said longitudinal axis of said active laser element;

b. a Q - switch unit ensuring giant pulsing of said active laser element, said Q-switch unit being positioned to the left of said active laser element; a longitudinal axis of said Q-switch unit, said longitudinal axis of said Q-switch unit coinciding with said longitudinal axis of said active laser element;

c. a fundamental frequency cavity formed by at least three mirrors totally reflecting said fundamental frequency beam;

d. a first mirror of said fundamental frequency cavity; a working surface of said first mirror; a normal to said working surface of said first mirror; said first mirror being positioned to the left of said Q-switch; said normal to said working surface of said first mirror coinciding with said longitudinal axis of said active laser element;

e. a second mirror of said fundamental frequency cavity deflecting said fundamental frequency beam; a deflected fundamental frequency beam; a longitudinal axis of said deflected beam of the fundamental frequency; an intersection zone of said fundamental frequency beam and said deflected fundamental frequency beam formed with the help of said second mirror; an external synchronism angle characterizing said intersection zone; said second mirror of said fundamental frequency cavity being positioned to the right of said active laser element;

f. a third mirror of said fundamental frequency cavity; a working surface of said third mirror; a normal to said working surface of said third mirror; said normal to said working surface of said third mirror coinciding with said longitudinal axis of said deflected beam of the fundamental frequency;

g. a nonlinear crystal generating the second harmonic under noncollinear synchronism conditions and transparent for the fundamental frequency and the second harmonic, said crystal being cut so that its shape and attitude in relation to the reference axes ensure compliance with the conditions of noncollinear synchronism; a second harmonic beam travelling along the bisectrix of said exterior synchronism angle; said nonlinear crystal being positioned in said zone of intersection of said fundamental frequency beam coming out of said active laser element and said deflected fundamental frequency beam.

2. A device as claimed in claim 1, wherein a second harmonic cavity comprises said nonlinear crystal, a first mirror of said second harmonic cavity totally reflecting said second harmonic, a working surface of said first mirror of said second harmonic cavity, a normal to said working surface of said first mirror, a second mirror of said second harmonic cavity, a working surface of said second mirror, a normal to said working surface of said second mirror, said first and second mirrors of said second harmonic cavity being placed on either side of said nonlinear crystal and said second mirror of said fundamental frequency cavity; said normals to said working surfaces of said first and second mirrors of said second harmonic cavity coinciding with the bisectrix of said external synchronism angle, said intersection zone being in contact by its base with said working surface of said second mirror of said fundamental frequency cavity, and said second mirror of said fundamental frequency cavity being made as a plane-parallel multi-dielectric coated substrate and being totally transparent for the second harmonic.

3. A device as claimed in claim 2, wherein said second mirror of said fundamental frequency cavity is made as a reflective prism for said fundamental frequency generation.

4. A device as claimed in claim 2, wherein said second mirror of said fundamental frequency cavity totally reflects the second harmonic and acts, at the same time, as said first mirror of said second harmonic cavity.

5. A device as claimed in claim 1, wherein a system of mirrors totally reflects the fundamental frequency and acts as said second mirror of said fundamental frequency cavity, said intersection zone formed with the help of said mirror system being positioned between said active laser element and said mirror system, and said nonlinear crystal being placed inside said second harmonic cavity, said first and second mirrors being placed on either side of said nonlinear crystal so that said normals to said working surfaces of said first and second mirrors coincide with the bisectrix of said external synchronism angle.

6. A device as claimed in claim 1, wherein at least one additional mirror introduced into said fundamental frequency cavity and totally reflecting the fundamental frequency, ensures travelling wave fundamental frequency conditions in said fundamental frequency cavity and allows formation of said interaction zone characterized by said external synchronism angle, said normals of all of said mirrors of said fundamental frequency cavity making the same angle with said longitudinal axis of said active laser element.

* * * * *